United States Patent [19]
Haskett et al.

[11] 3,985,855
[45] Oct. 12, 1976

[54] RECOVERING COPPER VALUES FROM OXIDIZED ORES

[75] Inventors: Philip R. Haskett; Donald J. Bauer; Carl H. Elges, III; Roald E. Lindstrom, all of Reno, Nev.

[73] Assignee: The United States of America as represented by the Secretary of the Interior, Washington, D.C.

[22] Filed: May 9, 1975

[21] Appl. No.: 576,393

[52] U.S. Cl. .................................................. 423/27
[51] Int. Cl.² ......................................... C01G 3/00
[58] Field of Search .................. 423/27, 28, 35; 75/101 R, 117; 204/106

[56] References Cited
UNITED STATES PATENTS

| | | | |
|---|---|---|---|
| 725,548 | 4/1903 | Ellis ................................ | 75/101 R |
| 932,643 | 8/1909 | Schneider ......................... | 423/27 |
| 2,970,096 | 1/1961 | Horton ............................. | 75/101 R |
| 3,661,740 | 5/1972 | Brace et al. ....................... | 75/101 R |

*Primary Examiner*—Oscar R. Vertiz
*Assistant Examiner*—Brian E. Hearn
*Attorney, Agent, or Firm*—Roland H. Shubert; Donald R. Fraser

[57] ABSTRACT

A process for recovering copper from oxidized ores by utilizing alkaline leachants having incorporated therein siliceous material to inhibit the dehydration of the formed copper complex, thereby permitting increased recovery and improved settling and filtering characteristics of the reacted slurry.

4 Claims, No Drawings

RECOVERING COPPER VALUES FROM OXIDIZED ORES

BACKGROUND OF THE INVENTION

1. Field of the Invention

The present invention relates generally to the hydrometallurgical recovery of metals from their source materials. More particularly, the present invention relates to the hydrometallurgical recovery of copper from its oxidized ores by utilizing alkaline leaching agents such as strong hydroxide or carbonate solutions.

2. Description of the Prior Art

It is presently known that copper may be recovered from its oxidized ores by utilizing an acid leaching agent such as sulfuric acid. However, the use of an acid leachant is feasible only when the oxidized copper ores are relatively free of calcium and/or magnesium carbonates. There are substantial amounts of oxidized copper ores which contain calcium and/or magnesium carbonates in such large quantities that the use of an acid leach is unsuitable because the acid reacts with the carbonates and largely exhausts itself thereon before combining with the copper. Other known leaching agents, such as cyanide and ammonia, have been utilized but these agents have been found to be objectionable primarily because of their toxicity and difficulty in handling.

In the situation where the copper is to be recovered from oxidized ores containing large amounts of carbonates, it has been proposed that such ores be leached with an alkaline or caustic leach solution such as an alkali metal hydroxide or carbonate. It has been shown that the higher solubilities of the hydroxides permit the use of stronger and consequently faster acting solutions. As such, the hydroxides are therefore preferable to the carbonate leach solutions.

The use of strong base leaching solutions, such as those containing sodium hydroxide, are known to be capable of solubilizing the copper contained in such minerals as azurite, malachite and chrysocolla. The species in solution is presumed to be some form of a hydroxy copper (II) complex. However, it has been found that difficulties in the form of erratic and low recovery rates occur when sodium hydroxide solutions are used to extract copper from oxidized copper ores. Though the basic causes of such difficulties have not heretofore been identified and overcome, the industrial implementation of sodium hydroxide leaching has been inhibited, if not abandoned altogether, notwithstanding the recognized advantage of this basic technique.

The present invention has discovered that one reason for the poor and erratic recovery of copper from its oxidized ores during alkali hydroxide leaching, such as with a sodium hydroxide solution, is the dehydration of the hydroxy copper (II) complex. This dehydration results in reprecipitation of the copper values in the slurry and, consequently, poor extraction. This undesirable effect is further promoted by higher temperatures and the presence of certain minerals in the ore itself.

SUMMARY OF THE INVENTION

The present invention serves to overcome the prior art difficulties and disadvantages encountered during the leaching of copper from its oxidized ores when a base or alkaline leach solution, such as a hydroxide, is utilized. This is accomplished by the incorporation of a siliceous material with the leaching solution to thereby inhibit the dehydration of the hydroxy copper (II) complex in the formed slurry. This results in an increase in the percent of copper recovered during a minimum period of time and also an improvement in the settling and filtering characteristics of the reacted slurry.

It is therefore an object of the present invention to provide for an improved process for the leaching of copper from its oxidized ores by the utilization of a base or alkaline leaching solution.

It is another object of the present invention to provide for a process of extracting copper from its oxidized ores that contain large amounts of carbonates, which carbonates render standard acid leaching techniques infeasible.

It is still another object of the present invention to provide for a process of leaching copper from its oxidized ores by utilizing an alkaline leaching agent which further prevents the dehydration of hydroxy copper complexes formed in the leaching solution.

It is yet another object of the present invention to provide for a process of leaching copper from its oxidized ores whereby improved optimum recovery of the copper values is achieved in a minimum period of time.

It is still yet another object of the present invention to provide for a process of leaching copper from its oxidized ores whereby the reacted leaching slurry acquires improved settling and filtering characteristics.

These and other objects of the present invention will be apparent from the following description and appended claims.

DESCRIPTION OF THE PREFERRED EMBODIMENTS

It has been shown that many different caustic or alkaline solutions may be used to leach copper from its oxidized ores. Though it is feasible to use sodium and potassium carbonates, the alkali metal hydroxides are shown to be much more efficient due to their higher solubilities which permit the use of stronger and consequently faster acting solutions. Such alkali metal hydroxides include sodium, potassium, and lithium hydroxides. Though all of these hydroxides, including mixtures thereof, are capable of performing the basic leaching function, it has been found that sodium hydroxide is the preferred solution since both potassium and lithium hydroxide are uneconomical. Sodium hydroxide yields more alkalinity per unit of weight than potassium hydroxide and is also more economical to use.

As previously indicated, the prior art difficulties and disadvantages encountered in the utilization of an alkaline leaching solution, such as sodium hydroxide, in recovering copper from its oxidized ores centers upon the dehydration of the hydroxy copper (II) complex, written as $[Cu(OH)_4]^{--}$, which dehydration results in reprecipitation of the copper values in the slurry, thereby resulting in poor and erratic recovery of the metal. However, it has now been found that by the addition of various siliceous materials to the leaching slurry system, increased and consistent copper recovery can be achieved during hydroxide extraction of the oxidized copper ores. This is because the siliceous material prevents or inhibits the dehydration of the hydroxy copper (II) complex, thereby preventing reprecipitation of the copper values in the slurry. Further, the utilization of the siliceous material additions to the slurry system serves to reduce the time needed for the actual leaching action which, under the practice of the present invention, occurs within a very short optimum contact period of time. This is in contrast to the much longer periods of time necessary when only an alkaline leaching solution is utilized in the absence of any siliceous material addition. It has also been found that the settling and filtering characteristics of the slurry system is markedly improved by the inclusion of siliceous material according to the present invention.

Though most siliceous materials known in the prior art may be utilized in the practice of the present invention, it has been found that the preferred siliceous materials are diatomaceous earth, sodium silicate and silicic acid. Any other base soluble silicate material may also be used, such as aluminum silicate, copper silicate (chrysocolla), potassium silicate or magnesium silicate (clinoenstenite). Though it is preferred that the siliceous material utilized be finely ground, siliceous material in liquid form, such as liquid sodium silicate, may also be satisfactorily utilized in the practice of the present invention.

In the base or alkaline leaching of copper from its oxidized ores when a hydroxide solution is utilized, the two following basic reactions occur:

I. The dissolution and formation of the hydroxy complex is expressed as:

$Cu^{++} + 4 (OH)^- \rightarrow [Cu(OH)_4]^{--}$, and

II. The subsequent dehydration of the complex is expressed as:

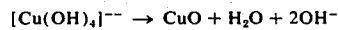

$[Cu(OH)_4]^{--} \rightarrow CuO + H_2O + 2OH^-$

The hydroxy copper (II) complex, $[Cu(OH)_4]^{--}$, is not highly stable and its dehydration, which is promoted by the product CuO, may be prevented to some degree by utilizing short contact times during the leaching operation. However, by employing only an alkaline leaching agent, such short contact times do not permit the efficient recovery of copper. The addition of a siliceous material containing silica serves to improve the stability of the hydroxy copper (II) complex so that dehydration is inhibited and short contact times may be utilized to advantage since improved efficiency of recovery is realized. Though some oxidized copper ores already contain silica, generally in the form of quartz, such naturally occurring amounts of siliceous material do not dissolve as readily as the copper minerals and therefore cannot assist in preventing the inevitable dehydration of the hydroxy copper (II) complex which forms when a hydroxide leaching solution is utilized. By the inclusion of additional siliceous material comprising silica through the practice of the present invention, such ores containing naturally occurring silica are also efficiently extracted.

In order to ensure the most effective optimum contact time between the leaching solution and copper ore, a rapid solid-liquid separation technique can be utilized to advantage. Also, it is necessary to utilize a relatively fine grind of the source material or ore being extracted. The efficient short contact time made possible by the present invention can be achieved, for example, by using well known prior art techniques such as centrifugal processes, contacting the ore with the leachant is a container or "vat", and passing the leachant rapidly through a relatively thin bed of the crushed, finely ground ore. This latter technique, often referred to as the "pour through" technique, is preferred for its efficiency since the ore is continually contacted with fresh leachant solution. An example of the embodiment of this technique would be to carry the crushed, ground ore on a belt filter which is operated by vacuum or gravity and spraying the hydroxide leaching solution on the ore from above. The resulting depleted ore would then be washed of its entrained hydroxy copper (II) complex solution in the same sequence. The pregnant solution could then be collected in fractions along the length of the belt filter such that downstream fractions could be used for upstream leaching, thereby effecting a countercurrent leaching operation. However, it is to be understood that this latter described technique is only one example of practicing the process of the present invention and is in no way limiting whatsoever. Any well known apparatus or techniques found suitable for the practice of the present invention process may also be employed to advantage.

Some examples will now be provided to show the advantages and improvements realized by the practice of the present invention wherein copper is extracted from its oxidized ore by the utilization of a caustic or alkaline leaching agent in conjunction with the addition of various siliceous materials comprising silica or $SiO_2$. The experimental examples were conducted with oxidized ores containing copper in the form of malachite wherein the ore was ground to a fineness of 90% minus 60 mesh.

EXPERIMENT I

In this Experiment, a series of runs were conducted in a laboratory beaker utilizing oxidized ore having a low silica content. The leaching solution comprised 800 milliliters of 25% sodium hydroxide, the period of extraction was 4 hours and the operating temperature was 60° C for each run. Silica in the form of $SiO_2 \cdot 2H_2O$ was utilized as the form of siliceous material. Several groups of test runs were conducted wherein the silica to ore ratio was varied for 25 grams ore, 50 grams ore and 100 grams ore. The result indicated that for the three different weights of ore used, the percent extraction increased with an increase in the silica to ore weight ratio. For example, when 25 grams of ore was used, recovery was increased from 43 to 98% by using a silica to ore ratio of 0.85:1. A similar relative gain was noted when 50 grams of ore was used, but the maximum copper extraction in this case was approximately 84% at a silica to ore ratio of 0.6:1. In the several runs conducted with 100 grams ore, it was shown that approximately 55% recovery was achieved by utilizing a silica to ore ratio of 0.2:1, but an approximate 73% recovery was realized for this same amount of ore when a silica to ore ratio of 0.4:1 was utilized.

Thus, Experiment I showed that the amount of $SiO_2$ required for optimum percent recovery of the copper values from the ore is approximately 50 to 100% by weight of the ore.

EXPERIMENT II

This Experiment involved several groups of test runs conducted on an oxidized copper ore containing approximately 23% $SiO_2$. The Experiment was conducted in a laboratory beaker and utilized 800 milliliters of 25% sodium hydroxide solution, 50 grams of ore and 3 hours of extraction time in all the test runs. Notwithstanding the relative high naturally occurring silica content of the ore, it was found that a definite correlation existed between ultimate extraction percent and an increase in added silica to ore weight ratio. For example, in the series of runs conducted at 90° C, a 10% improvement in extraction was realized with a silica to ore ratio of 0.6:1. Similarly, approximately 9% extraction improvement was realized at 25° C with a silica to ore ratio of 0.4:1. This Experiment provides strong indication that, notwithstanding the high amount of naturally occurring silica in the original ore material, the addition of other siliceous materials, in this case $SiO_2 \cdot 2H_2O$, definitely improves the overall extraction process to provide maximum recovery. The results indicated that, because of the added silica, the hydroxy copper (II) complex remains dissolved in the slurry and does not reprecipitate with the passage of time. Also, this Experiment showed that optimum extraction is realized within a temperature range of approximately 60° C to 100° C.

EXPERIMENT III

This Experiment involved a series of test runs conducted at 27° C, 60° C and 90° C for the purpose of ascertaining the effects of reaction time on the percent of extraction recovery. As noted in Experiments I and II, several hours were allotted in these latter cases to assure that a maximum percent of extraction would occur in the individual test runs. The instant Experiment, however, was set up to ascertain the actual reaction time necessary for optimum or maximum percentage of extraction recovery by the utilization of only a hydroxide leachant in the absence of the addition of siliceous material in accordance with the present invention. A vat-type extraction was effected by utilizing a laboratory beaker. The results indicated that optimum recovery was effected in a relatively short period of time for each temperature tested. However, this optimum recovery was well below that which could be realized with the addition of siliceous material as shown in the results of Experiment II. For example, at 27° C, a maximum recovery of 60% was realized in approximately 15 minutes, after which time the amount of dissolved hydroxy copper (II) complex dropped off rapidly. At 60° C, a maximum recovery of 55% extraction was realized in about 6 minutes with an immediate loss of dissolved complex values occurring thereafter. Similarly, at 90° C, a maximum recovery of about 38% was realized in a very few minutes, but the amount of dissolved complex rapidly decreased after this short period of time.

Thus, Experiment III shows that the absence of added siliceous material is detrimental with respect to the ultimate maximum percent of recovery as well as promoting the reprecipitation of the hydroxy copper (II) complex which does not appear to remain in solution in the absence of silica additions in accordance with the present invention.

EXPERIMENT IV

The following table showing PERCENT EXTRACTION provides a tabulation of the results received on a series of test runs conducted to show the effect of percent of extraction realized based upon different amounts of silica with various reaction or leach times. The runs were conducted at 90° C, utilized 75 grams of ore and 800 milliliters of 25% sodium hydroxide. The source of silica was diatomaceous earth. As is clearly evident, the results demonstrate that an increase in the amount of added silica produces a corresponding increase in the percent extraction for each given reaction or leach time. As is also shown, optimum results are achieved with relatively short contact or leach times of less than approximately 15 minutes. All of these test runs were conducted utilizing the vat-type leaching technique. Similar runs conducted utilizing the pour-through technique showed that optimum recovery is achieved within a contact time of approximately 30 seconds.

| | PERCENT EXTRACTION | | | |
|---|---|---|---|---|
| | Leachant Contact Time (mins.) 1 | 3 | 8 | 40 |
| Diatomaceous Earth (grams) | | | | |
| 0 | 37.5 | 33.0 | 30.0 | 11.7 |
| 5 | 47.7 | 48.3 | 50.8 | 33.8 |
| 15 | 49.8 | 50.2 | 58.4 | 52.3 |
| 40 | 60.9 | 50.8 | 60.0 | 63.5 |
| 100 | 89.0 | 86.3 | 88.6 | 87.4 |

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A process for recovering copper values from oxidized copper ores selected from the group consisting of azurite, malachite, chrysocolla and mixtures thereof, which comprises leaching the ore with an alkali metal hydroxide leach solution containing added siliceous material consisting of diatomaceous earth, said siliceous material being added in sufficient amount to inhibit the dehydration of hydroxy copper (II) complex and to maintain said complex in solution.

2. The process of claim 1 wherein the alkali metal hydroxide is sodium hydroxide.

3. The process of claim 1 wherein the leaching is conducted within a temperature range of approximately 60° to 100° Centigrade.

4. The process of claim 1 wherein the contact time between the leaching agent and the ore is less than approximately 15 minutes.

* * * * *